Figure 1:
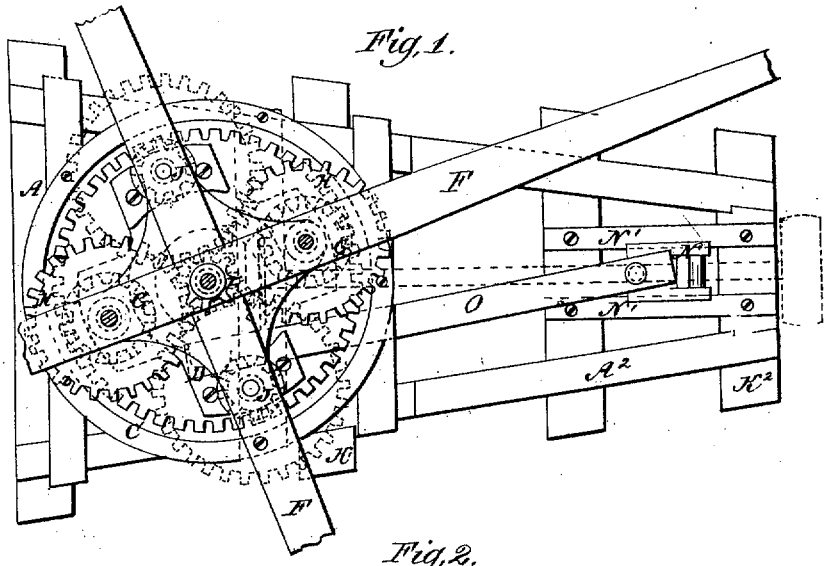
Figure 2:
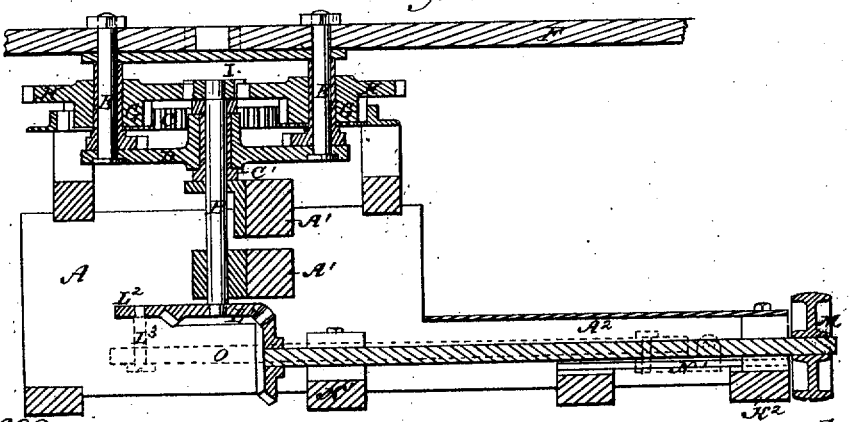

W. H. Wiley,

Horse Power.

No. 3,059. Reissued July 28, 1868.

Witnesses.

W. H. Becker.

Wm. J. Chamberlain.

Inventor.

Wm. H. Wiley by Forbush & Hyatt

N. PETERS, PHOTO-LITHOGRAPHER, WASHINGTON, D. C.

United States Patent Office.

WILLIAM H. WILEY, OF FREDONIA, NEW YORK.

*Letters Patent No.* 70,768, *dated November* 12, 1867; *reissue No.* 3,059, *dated July* 28, 1868.

IMPROVED HORSE-POWER.

The Schedule referred to in these Letters Patent and making part of the same.

TO ALL WHOM IT MAY CONCERN:

Be it known that I, WILLIAM H. WILEY, of Fredonia, county of Chautauqua, and State of New York, have invented certain new and useful Improvements in Horse-Powers; and I do hereby declare that the following is a full, clear, and exact description thereof, reference being had to the accompanying drawings, making a part of this specification.

My invention relates to that class of horse-power machines in which the horses travel around a vertical axis and give motion to a vertical shaft by an arrangement of draught-levers and gearing.

The nature of my invention consists—

First, in combining a gear-table with the draught-levers, so as to support said levers upon a fixed central spindle, and form a gear-frame to hold driving-pinions and spur-wheels, so that said driving-pinions and spur-wheels may be carried around a stationary and concentric gear-rim by the motion of the draught-levers, and thereby made to actuate a central shaft.

Second, in extending the frame of the machine (by which the vertical shaft and driving-gearing are supported) laterally across and beyond the circular road travelled by the horses, and providing said frame-extension, first, with slides for the reception of a drag-saw cross-head, so that the drag-saw may be operated directly from the central driving-shaft by a pitman connecting said cross-head with a crank on said driving-shaft, and secondly, in providing said frame-extension with bed-pieces fitted for the reception of pillow-blocks, (when said drag-saw, cross-head, and pitman are removed,) to form bearings for the support of a horizontal shaft, receiving motion from the vertical shaft through the medium of a pair of bevel-gears, and carrying upon its outer end a pulley, from which motion may be transmitted to threshing-machimes, feed-cutters, or other similar farm-implements, by which plan of construction and arrangement the machine is readily adapted to the production of either circular or reciprocating motion, and in either form all the parts are firmly supported by the same frame, and any disalignment thereof prevented.

Third, in providing for a change in velocity of the main driving-shaft under a uniform travel of the horses in feet per minute, by providing the rotating table, to which the draught-poles are attached, with pinion-spindles, placed at varying distances from the axis of rotation of said table, so that pinions of varying sizes may be used between the stationary cog-rim and the main-shaft pinion, to increase or diminish the velocity of the main shaft, as required.

In the accompanying drawings—

Figure I is a top plan of said machine.

Figure II is a vertical longitudinal section of same.

Like letters refer to like parts in each of the figures.

A $A^1$ represent the main frame of the machine, upon which the operating parts are supported, and $A^2$ a covered extension thereof, supporting those parts which transmit the power to the outside of the circular road upon which the horses travel.

B represents the main central driving-shaft, supported in appropriate journal-bearings, secured to cross-pieces $A^1$ of the main frame.

C represents the stationary internal cog-rim, securely bolted to the top of the main frame, concentric with shaft B.

D represents the gear-table, turning upon a fixed spindle, C′, concentric with shaft B and cog-rim C, the spindle being made hollow, for the passage of the shaft B, one of the journal-bearings of which it forms.

E represent the spindles, secured to upper side of gear-table D, and projecting upward therefrom, the draught-levers F being rigidly secured to said spindles by bolts or otherwise, so that the draught-levers are supported upon the fixed central spindle C′, and caused to move about the same as a fulcrum, carrying with them in their movement the table D.

G represents pinions, turning loosely upon the spindles E, and meshing with the cog-rim C, so that being carried around said rim by the movement of the draught-levers, they will receive motion therefrom.

H represents spur-wheels, secured firmly to said pinions, so as to revolve with them upon the spindles, they being arranged above the pinions so as to overhang the cog-rim.

I represents a pinion on the upper end of shaft B, with which spur-wheels H mesh, thereby communicating the motion of pinions G to the central shaft B.

The gear-table D being separated from the draught-levers by the spindles E, the required space for the reception of the gears G, H, and I is obtained, and a frame constituted to support and carry them about the cog-rim.

A proper fixed fulcrum is also obtained for the draught-levers by the location of the gear-table below the plane of the cog-rim, without interfering with the meshing of gears H with the centre pinion I, or of pinions G with the cog-rim.

The spindles E are secured to table D at unequal distances from the centre thereof, and in order to produce a greater velocity in the central shaft B with the same speed of movement for the horses, I provide an additional set of pinions and spur-wheels, the difference in the diameters of which is greater than that of the pinions G and spur-wheels H. The varying distance of the spindles E from the centre of the table D corresponds with the difference in size of the pinions, so that they will all properly mesh with the cog-rim. This additional set of gearing is shown in red dotted lines in Fig. I, in the position the same occupies when used in lieu of gearing G H.

It will readily be seen that when great strength is not an object, only one spur-wheel and pinion of either set may be used to advantage, but for heavy work both should be used.

J J are boss-pinions, which are placed upon two of the spindles E, between the driving-gear. They mesh with the internal gear C, and serve to steady the movement of the levers and table.

These boss-pinions may or may not be used, as desired, but when only one pinion G and spur-wheel H are used, one of these boss-pinions should always be placed upon the spindle opposite, for the purpose of preventing undue strain upon the parts.

K represents a horizontal shaft, supported in bearings upon the removable cross-pieces $K^1$ $K^2$, which are parts of the extension $A^2$ of the frame of the machine. Upon the inner end of this shaft a bevel-wheel, L, is attached, which gears with a corresponding bevel-wheel, $L^1$, upon the lower end of vertical shaft, B, so as to receive motion therefrom. Upon its outer end the shaft carries an overhung pulley, M, from which, by means of a belt, power may be transmitted to any one of the various agricultural machines now in use, such as feed-cutters, threshing-machines, and the like.

The bevel-wheel $L^1$ is further provided with an arm, $L^2$, at one side, carrying a crank-wrist, $L^3$.

By this means the motion of the vertical shaft may be applied directly to operate a drag-saw by a simple and easy change in the connections. The cross-pieces $K^1$ $K^2$ are taken off by removing the bolts which secure them to the main frame, and the horizontal shaft K, bevel-wheel L, and pulley M may then be lifted out of the frame and removed.

Then the cross-head N is placed within the slides N′, (which are a fixture upon the framework,) and a connection between the cross-head N and crank-wrist $L^3$ is formed by the pitman O.

The cross-head N and pitman O are shown in dotted red lines, representing them as used in lieu of the horizontal shaft, bevel-wheel, and pulley. A drag-saw may be attached to the cross-head N in a common manner, and the wood-mill is complete.

The changes necessary to increase or diminish the speed of the driving-shaft may be made easily, and in a short time, as may also the changes necessary to produce circular or reciprocating motion, as may be required.

Both of these features meet a long-felt want of farmers, by whom these machines are principally used.

The first enables them to suit the speed to the strength of their horses, and the second to set up and arrange the machine for the several kinds of work to be done with the greatest ease, thereby overcoming a great difficulty existing in other machines.

The arrangement of the gearing within the frame formed by the draught-levers and table D, secures the highest degree of compactness, strength, and durability.

Having thus described my invention, what I claim, and desire to secure by Letters Patent, is—

1. The gear-table D, rigidly connected to the draught-levers F by the interposed spindles E, or their equivalent, so as to form a gear-frame for carrying the pinions and spur-wheels G H about the internal stationary cog-rim C, and also a support for the draught-levers upon the stationary central spindle C′, substantially as described.

2. The pinion-spindles E, when secured to the table D at varying distances from the centre thereof, so that different sizes of pinions to gear with cog-rim C, and spur-wheels to gear with pinion I, may be used, as and for the purpose set forth.

Witnesses:

LUCIUS HURLBUT,

PHILIP S. COTTLE.

W. H. WILEY.